(12) United States Patent
Tsubaki (10) Patent No.: US 7,705,887 B2
(45) Date of Patent: Apr. 27, 2010

(54) IMAGING DEVICE, TERMINAL DEVICE, AND IMAGING SYSTEM

(75) Inventor: Hisayoshi Tsubaki, Asaka (JP)

(73) Assignee: Fujifilm Corporation, Tokyo (JP)

( * ) Notice: Subject to any disclaimer, the term of this patent is extended or adjusted under 35 U.S.C. 154(b) by 940 days.

(21) Appl. No.: 10/727,546

(22) Filed: Dec. 5, 2003

(65) Prior Publication Data

US 2004/0109199 A1    Jun. 10, 2004

(30) Foreign Application Priority Data

Dec. 10, 2002    (JP)    ............................. 2002-357448

(51) Int. Cl.
*H04N 5/232*    (2006.01)
*G06F 7/00*    (2006.01)
*H04N 7/18*    (2006.01)

(52) U.S. Cl. .................. 348/211.4; 707/1; 348/139; 348/151; 348/152; 348/153; 348/155; 348/159

(58) Field of Classification Search ............. 348/211.4, 348/211.99, 207.1, 139, 143–153, 159; 709/224
See application file for complete search history.

(56) References Cited

U.S. PATENT DOCUMENTS

| | | | | | |
|---|---|---|---|---|---|
| 5,809,161 | A | * | 9/1998 | Auty et al. | 382/104 |
| 6,490,409 | B1 | * | 12/2002 | Walker | 386/117 |
| 6,694,151 | B2 | * | 2/2004 | Carlson | 455/556.1 |
| 6,937,154 | B2 | * | 8/2005 | Zeps et al. | 340/573.1 |
| 7,024,488 | B1 | * | 4/2006 | Sah | 709/240 |
| 2002/0030745 | A1 | * | 3/2002 | Squilla et al. | 348/207 |
| 2002/0049728 | A1 | * | 4/2002 | Kaku | 707/1 |
| 2002/0107052 | A1 | * | 8/2002 | Carlson | 455/566 |
| 2002/0126013 | A1 | * | 9/2002 | Bridgelall | 340/572.1 |
| 2002/0145752 | A1 | | 10/2002 | Hanabusa et al. | |
| 2004/0109199 | A1 | | 6/2004 | Tsubaki | |
| 2004/0148404 | A1 | * | 7/2004 | Muroya et al. | 709/228 |
| 2004/0201738 | A1 | * | 10/2004 | Moores et al. | 348/231.2 |
| 2004/0239776 | A1 | * | 12/2004 | Shinohara et al. | 348/239 |
| 2005/0093986 | A1 | * | 5/2005 | Shinohara et al. | 348/208.1 |

FOREIGN PATENT DOCUMENTS

JP    9-23359 A    1/1997

(Continued)

*Primary Examiner*—Sinh Tran
*Assistant Examiner*—Christopher K Peterson
(74) *Attorney, Agent, or Firm*—Birch, Stewart, Kolasch & Birch, LLP (57) ABSTRACT

A terminal device 1 including a wireless communication unit 11 is carried by a subject user who will become a subject, and a wireless communication unit 21 for performing directional data communication in an imaging direction is provided in a camera 2. When the terminal device 1 and the camera 2 become able to communicate data each other, the subject user carrying the terminal device 1 is photographed, and image data obtained in this way are transmitted to the terminal device 1. The terminal device 1 displays the image data. If necessary, the subject user issues an instruction to print the image data, and transmits information on the instruction to print to the camera 2. The camera 2 assigns the information on the instruction to print to the image data, and transmits the information on the instruction to print and the image data to an image server 4 and further to a printer 5.

11 Claims, 8 Drawing Sheets

FOREIGN PATENT DOCUMENTS

| | | |
|---|---|---|
| JP | 11-215421 A | 8/1999 |
| JP | 2001-197404 A | 7/2001 |
| JP | 2001-309284 A | 11/2001 |
| JP | 2002-24229 A | 1/2002 |
| JP | 2002-41703 A | 2/2002 |
| JP | 2002-112074 A | 4/2002 |
| JP | 2002-290799 A | 10/2002 |
| JP | 2004-193819 | 7/2004 |
| JP | 4080316 B2 | 2/2008 |

* cited by examiner

IMAGING DEVICE, TERMINAL DEVICE, AND IMAGING SYSTEM

BACKGROUND OF THE INVENTION

1. Field of the Invention

The present invention relates to an imaging device for photographing a subject, installed in a facility, e.g., theme park, etc., a terminal device carried by the subject, and an imaging system including the imaging device and the terminal device.

2. Description of the Related Art

Services are provided wherein a camera is installed at a particular spot in an attraction in a facility such as a theme park, and a user riding on a ride in the attraction is photographed. A photographic image obtained in this way is printed out and offered to the user.

A system has been proposed wherein: a base station which can communicate data is placed in a facility; the base station receives image data representing a photographic image, transmitted from a digital camera including a communication means together with identification information of the digital camera; the image data received by the base station are printed out; and prints are sorted according to the identification information (refer to Japanese Unexamined Patent Publication No. 2001-197407). Another system has been proposed wherein: a camera is lent to a visitor to a facility; and image data shot by the lent camera are transmitted to an image storage device and printed out (refer to Japanese Unexamined Patent Publication No. 2001-309284).

Further, an imaging device has been proposed, which enables easy following of a subject of photography by: attaching an infrared transmitter to the subject; detecting a signal output from the infrared transmitter using a camera; and displaying the detected signal (refer to Japanese Unexamined Patent Publication No. 9(1997)-23359).

However, in the systems described in Japanese Unexamined Patent Publication No. 2001-197407 and Japanese. Unexamined Patent Publication No. 2001-309284, a person carrying the camera cannot become the subject. Therefore, there is a problem that there are no or only a few photographic images of the person carrying the camera when images are photographed in the facility. Further, since it is often impossible to perform photography while riding a ride in an attraction, it is difficult to record an image of the visitor enjoying the attraction as a photographic image.

On the other hand, if images are photographed by the camera installed in the attraction, it is possible to record the image of the user enjoying the attraction in the photographic image. However, the user who was the subject needs to find the photographic image of him/herself from among many photographic images displayed at an exit of the attraction, which is extremely troublesome for the user. Further, when time passes after riding on the attraction, the photographic images will no longer be displayed. Therefore, if the user fails to order the photographic image of him/herself, the user will never be able to obtain the photographic image. Additionally, space for displaying the photographic images is necessary in the facility.

SUMMARY OF THE INVENTION

In view of the foregoing circumstances, it is an object of the present invention to make it possible for anyone to become the subject.

An imaging device according to the present invention includes an imaging means for photographing a subject and obtaining image data representing an image of the subject, an imaging wireless communication means for performing directional wireless data communication, and a control means for controlling drive of the imaging means so that the imaging means is driven to obtain the image data when a subject wireless communication means in a terminal device carried by the subject, including a display means for displaying the image data and the subject wireless communication means for wirelessly communicating data, and the imaging device wireless communication means have become able to communicate with each other.

As the "imaging device wireless communication means" and "subject wireless communication means", any means, e.g., wireless LAN, Bluetooth, etc. for short distance communication, UWB (Ultra Wide Band), or the like can be used as long as data can be communicated.

The term "directional" means that a data communication range points to only one direction from the imaging device wireless communication means. However, since it is difficult to form the data communication range in a straight line, the data communication range of the imaging device wireless communication means can spread in a fan shape.

In the imaging device according to the present invention, the control means can be a means for assigning terminal information that specifies the terminal device carried by the subject to the image data.

The "terminal information that specifies the terminal device" is information unique to the terminal device, by which the terminal device can be specified. Specifically, a model name of the terminal device, the name of a person carrying the terminal device and the like may be used. In the case that the terminal device is a cellular phone, the telephone number may be used.

The term "assigning to the image data" means that the image data and the terminal information become inseparable. For example, the terminal information is written in tag information of the image data, text data describing the terminal information are attached to the image data, etc.

In the imaging device according to the present invention, the control means can be a means for further controlling drive of the imaging device wireless communication means so that the imaging device wireless communication means transmits the image data obtained by the imaging means to the terminal device.

In this case, the control means can be a means for generating small capacity image data of which data volume is less than the image data and transmitting the small capacity image data to the terminal device instead of the image data.

For generating the "small capacity image data", various methods, e.g., reducing a number of pixels by thinning, deteriorating image quality, improving a compression ratio, etc. can be used.

Further, in the imaging device according to the present invention, the imaging device wireless communication means and the imaging means can be arranged so that a data communication direction of the imaging device wireless communication means and an imaging direction of the imaging means are substantially identical.

In this case, the imaging device wireless communication means and the imaging means can be also arranged so that the data communication range of the imaging device wireless communication means is less than an imaging angle of view of the imaging means.

When the imaging device wireless communication means and the subject wireless communication means become able to communicate data each other and images are photographed, photography continues as long as the data can be communicated. Therefore, the control means can also be a means for controlling the drive of the imaging means so that photography is prohibited after a predetermined number of images have been photographed continuously.

Further, when the subject stays in front of the imaging device, photography continues as long as the subject stays there. Therefore, the control means can also be a means for controlling the drive of the imaging means so that photography is prohibited for predetermined time after photography.

In the imaging device according to the present invention, the control means can also be a means for controlling the drive of the imaging means so that the imaging means performs photography only when the terminal device gives an instruction to perform photography.

The terminal device according to the present invention includes a subject wireless communication means for wirelessly communicating data with the wireless communication means in the imaging device according to the present invention and a display means for displaying information, including image data. The terminal device is carried by the subject.

The terminal device according to the present invention can further include an informing means for informing the subject that the subject wireless communication means has become able to communicate data with the imaging device wireless communication means, that an image will be photographed, and/or that photography has been finished.

The "informing means" is a means for making the subject recognize that data communication has become possible, by appealing to his/her five senses. Specifically, the informing means can make the subject recognize that data communication has become possible by voice, a display on the display means, lighting or blinking of a LED, vibration of the terminal device itself, etc. An imaging system according to the present invention includes the imaging device according to the present invention and the terminal device according to the present invention.

Further, the imaging system according to the present invention may include a plurality of the imaging devices of which imaging ranges overlap. The control means in each of the imaging devices can be a means for controlling the drive of the imaging device wireless communication means and the imaging means so that when all the plurality of the imaging devices have become able to communicate data with the terminal device, the imaging means in the plurality of the imaging devices perform photography respectively.

The imaging system according to the present invention can further include an image server for storing the image data obtained by the imaging device.

The imaging system according to the present invention can further include a print out means for printing out the image data obtained by the imaging device.

In this case, the print out means can be a means for printing out only the image data for which an instruction to print has been issued.

Further, in this case, the instruction to print can be issued at the terminal device.

In the imaging device, terminal device, and imaging system according to the present invention, when the imaging device wireless communication means has become able to communicate data with the subject wireless communication means in the terminal device carried by the subject, the imaging means is driven and the image data representing the image of the subject are obtained. Therefore, anyone can become the subject of the imaging device according to the present invention, as long as they carry the terminal device.

By assigning the terminal information that specifies the terminal device carried by the subject to the image data, when the image data are stored or printed out, the image data and the prints can be sorted according to the terminal information. Accordingly, it becomes easy to find the image data and the prints later.

Since the image data are displayed on the display means in the terminal device by transmitting the image data obtained by the imaging means to the terminal device, the subject can look at the photographed image immediately after photography. Therefore, when the imaging system according to the present invention is installed in the attraction in a facility such as a theme park, the subject does not need to try to find the photographic image of him or herself at the exit of the attraction, and the subject does not fail to obtain the photographs. Additionally, space for displaying the photographs of the subject becomes unnecessary.

Further, by transmitting the small capacity image data to the terminal device instead of the image data, it is possible to reduce time for displaying the image data obtained by the imaging device in the terminal device.

Further, by arranging the imaging device wireless communication means and the imaging means so that the data communication direction of the imaging device wireless communication means and the imaging direction of the imaging means are substantially identical, it becomes easy to include the subject in the image obtained by the imaging means.

In this case, by arranging the imaging device wireless communication means and the imaging means so that the data communication range of the imaging device wireless communication means is less than an imaging angle of view of the imaging means, the subject can be surely included in the image obtained by the imaging means.

Further, by prohibiting photography after a predetermined number of image have been photographed continuously, it is possible to prevent continuous photography of the subject carrying the terminal device which is in a data communicable range of the imaging device wireless communication means.

Further, by prohibiting photographing for a predetermined time after photography, it is possible to prevent continuous photography of the subject carrying the terminal device even when the subject stays in front of the imaging device.

Further, by controlling the drive of the imaging means so that the imaging means performs photograpny only when the instruction to perform photography is given from the terminal device, it is possible to make the imaging means perform photography only when the subject wants to be photographed and to display the image data in the terminal device. Therefore, it is possible to prevent the subject from being shot in an undesirable posture, e.g., looking aside, squatting, etc.

Further, by making the terminal device include the informing means for informing the subject that the subject wireless communication means has become able to communicate data with the imaging device wireless communication means imaging, that an image will be photographed, and/or that photography has been finished, the subject can know that the imaging device and the terminal device have become able to communicate data with each other, that an image will be photographed soon, and/or that photography has been finished.

Further, a plurality of the imaging means of which imaging ranges overlap may be provided in the imaging system. In this case, when all the plurality of the imaging devices have become able to communicate data with the terminal device, by photographing respectively using the imaging means in the plurality of the imaging devices, it is possible to photograph the subject surely compared with a case of photographing using a single imaging device. When the terminal device has become able to communicate data at a position far from the imaging device wireless communication means, the subject included in the photographed image becomes small. Therefore, by arranging the plurality of the imaging devices with overlapping imaging ranges so that the subject in an appropriate size is included in the photographic image, it is possible to obtain the photographic image including the subject in the appropriate size. Further, since the imaging range can be set in advance, it is possible to know an approximate distance between the imaging device and the subject.

Further, by providing the image server for storing the image data obtained by the imaging device in the imaging system, the subject can browse the photographic images of him or herself later by accessing the image server.

Further, by providing the print out means for printing out the image data obtained by the imaging device in the imaging system, the subject can obtain the print of the photographic image of him or herself.

In this case, by printing out only the image data for which the instruction to print has been issued, it is possible to prevent printing out of unnecessary image data.

Further, in this case, when the instruction to print is issued at the terminal device, the subject can look at the image data displayed after photography and decide immediately if the image data should be printed or not. Therefore, it is possible to record an exact feeling when the image is photographed in a print.

DESCRIPTION OF THE PREFERRED EMBODIMENTS

Figure 1:
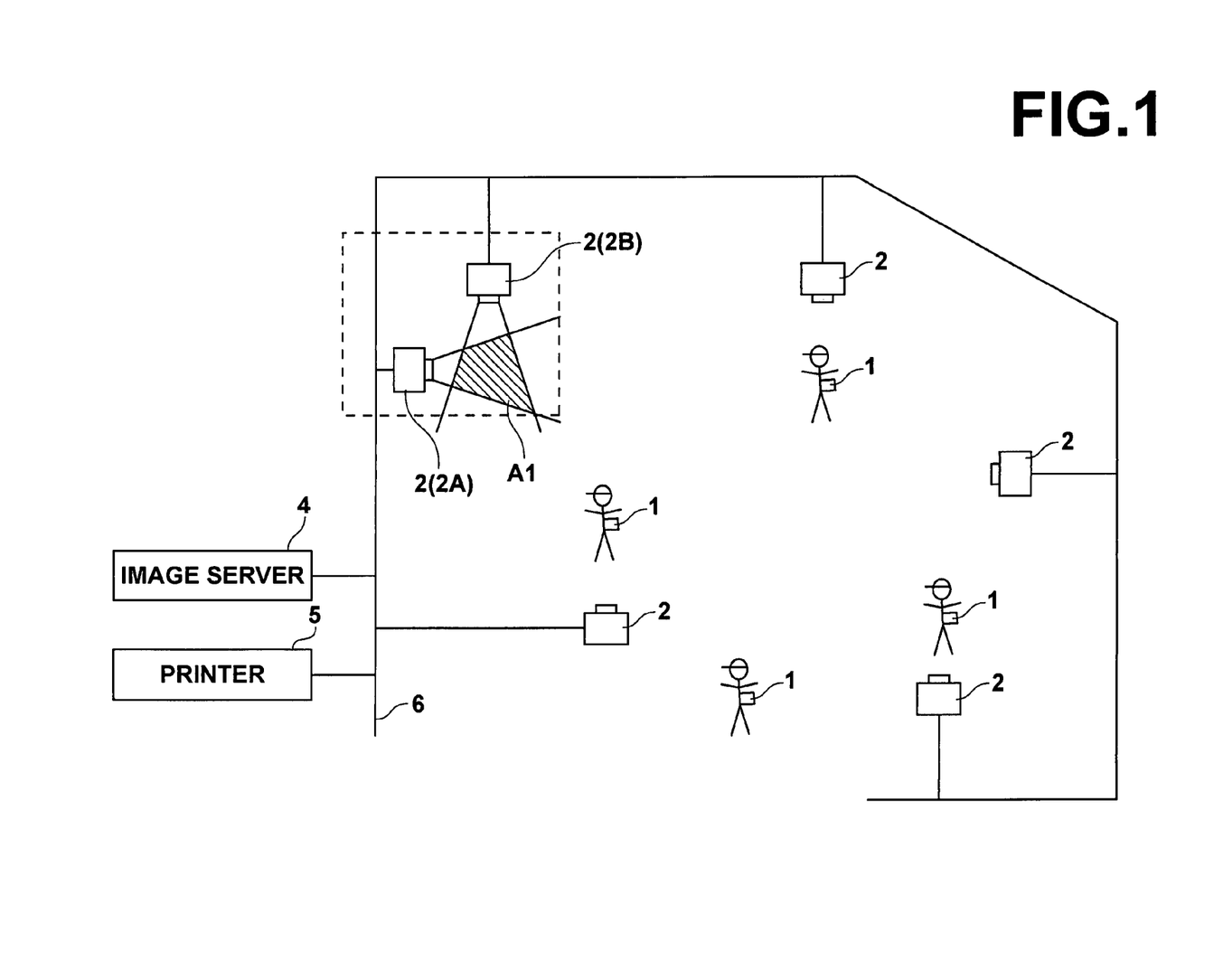
FIG. 1 is a schematic block diagram showing a configuration of an imaging system according to a first embodiment of the present invention.

Hereinafter, embodiments of the present invention will be described with reference to drawings. FIG. 1 is a schematic block diagram showing a configuration of an imaging system according to a first embodiment of the present invention. The imaging system according to the first embodiment is a system, where a visitor at a facility is photographed as a subject in a facility such as a theme park. The imaging system includes a terminal device 1 carried by the visitor (hereinafter, called subject user) who will become the subject, a plurality of cameras 2 installed in various places in the facility to obtain image data S0 by photographing the subject user, an image server 4 for storing the image data S0, a printer 5 for printing out the image data S0, and a LAN 6 for connecting the cameras 2, image server 4, and printer 5.

Figure 2:
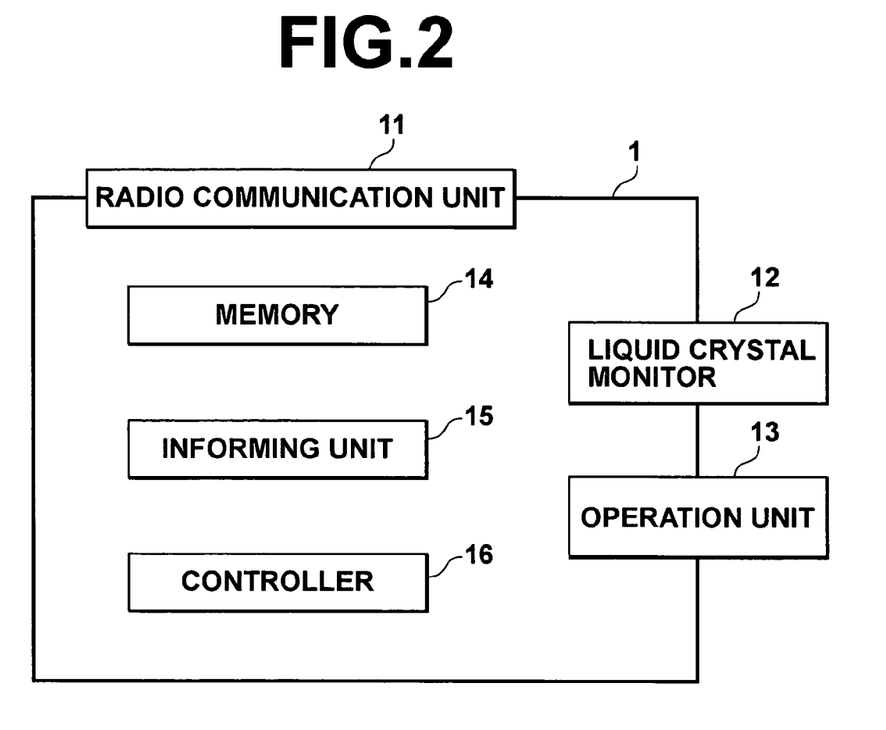
FIG. 2 is a schematic block diagram showing a configuration of a terminal device.

FIG. 2 is a schematic block diagram showing a configuration of the terminal device. As illustrated in FIG. 2, the terminal device 1 includes: a wireless communication unit 11 for wirelessly communicating data with the camera 2 as will be described later and receiving thumbnail image data SM of the image data S0 obtained by the camera 2; a liquid crystal display monitor 12 for displaying various information, such as thumbnail image data SM; an operation unit 13 for operating the terminal device 1; a memory 14 for storing various information, such as thumbnail image data SM; an informing unit 15 for informing the subject user that the terminal device 1 has become able to communicate with the camera 2; and a controller 16 for controlling communication and controlling display of the terminal device 1.

Terminal information (e.g., a model name of the terminal device, a name of a person carrying the terminal device, etc.) that specifies the terminal device 1 is stored in the memory 14. As will be described later, when the terminal device 1 becomes able to communicate data with the camera 2, the controller 14 reads the terminal information from the memory 14, and transmits the terminal information to the camera 2 via the wireless communication unit 11.

The informing unit 15 informs the subject user by voice, vibration, lighting or blinking of an LED, display on the liquid crystal monitor 12, etc. that the wireless communication unit 11 has become able to communicate data with the camera 2, that an image will be photographed and/or that the image has been photographed. In the description of this embodiment, it is assumed that the informing unit 15 informs the subject data that the wireless communication unit 11 has become able to communicate data with the camera 2.

The subject user can look at a photographic image displayed on the liquid crystal monitor 12 and issue an instruction to print out the photographic image or an instruction to store the photographic image in the image server 4 by operating the operation unit 13. The controller 16 generates information according to the instruction from the operation unit 13, e.g., information regarding the instruction to print, or information regarding the instruction to store in the image server, and controls drive of the wireless communication unit 11 so that the wireless communication unit 11 transmits the generated information to the camera 2.

It is also possible to set a condition at the camera in advance to print in a default state so that the instruction to print can be issued easily. Accordingly, unless the subject user issues an instruction not to print, the image data S0 obtained by the camera 2 are printed out by the printer 5. On the contrary, it is also possible to set a condition at the camera 2 not to print in the default state, and the image data S0 can be printed out by the printer 5 only when the subject user has issued the instruction to print. In the description of this embodiment, it is assumed that the condition is set at the camera 2 not to print in the default state.

Figure 3A:
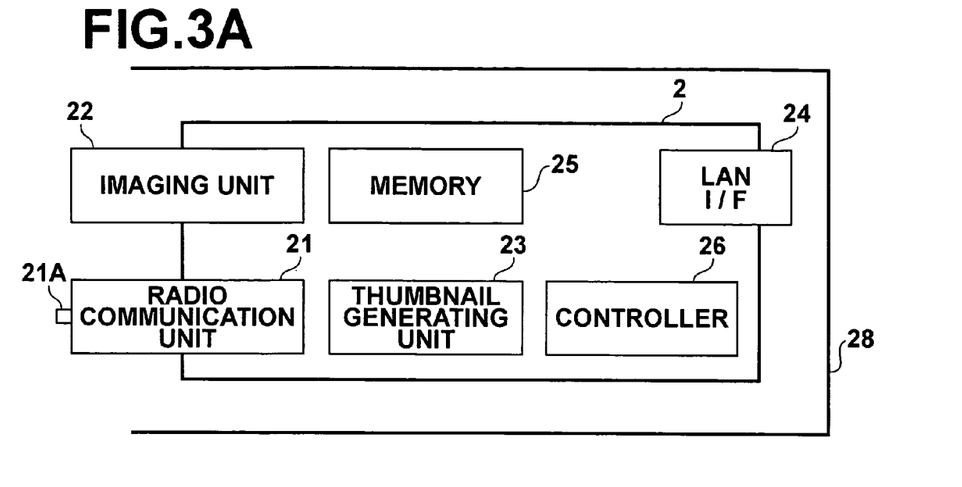
FIG. 3A is a schematic block diagram showing a configuration of a camera.
Figure 3B:
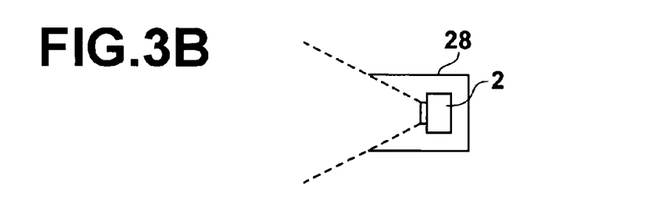
FIG. 3B is a schematic view showing a configuration of the camera.

FIG. 3A is a schematic block diagram showing a configuration of the camera 2. As illustrated in FIG. 3A, the camera 2 includes: a wireless communication unit 21 for wirelessly communicating data with the terminal device 1 carried by the subject user; an imaging unit 22 for photographing the subject user and obtaining the image data S0 representing the photographic image of the subject user; a thumbnail generating unit 23 for reducing the image data S0 and generating the thumbnail image data SM; a LAN interface 24 for connecting the camera 2 to the LAN 6; a memory 25 which serves as a work area; and a controller 26 for controlling imaging and controlling communication of the camera 2. Further, the camera 2 is housed in a case 28 which is shielded with respect to electromagnetic waves so that the wireless communication unit 21 performs directional wireless communication. Accordingly, as illustrated by broken lines in FIG. 3B, the wireless communication unit 21 in the camera 2 is enabled to perform directional data communication.

Figure 3C:
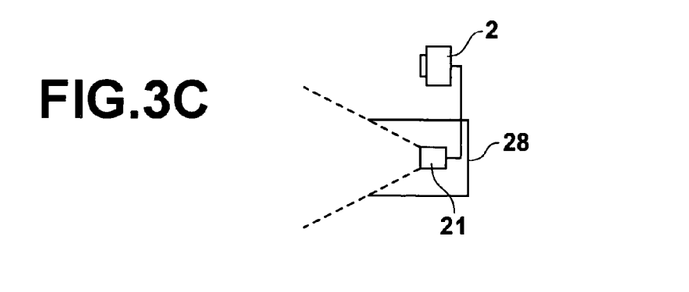
FIG. 3C is a schematic view showing an alternate configuration of the camera.

As illustrated by broken lines in FIG. 3C, it is also possible that only the wireless communication unit 21 is housed in the case 28 so that the wireless communication unit 21 performs directional data communication.

The imaging unit 22 includes an imaging lens, zoom mechanism, shutter, CCD, etc. The imaging unit 22 photographs the subject user by driving the shutter and obtains the image data S0 representing the photographic image of the subject user. As will be described later, an angle of view of the imaging unit 22 and a data communication range of the wireless communication unit 21 are substantially identical so that the subject user carrying the terminal device 1 which has become able to communicate data with the wireless communication unit 21 can surely be photographed.

Figure 3D:
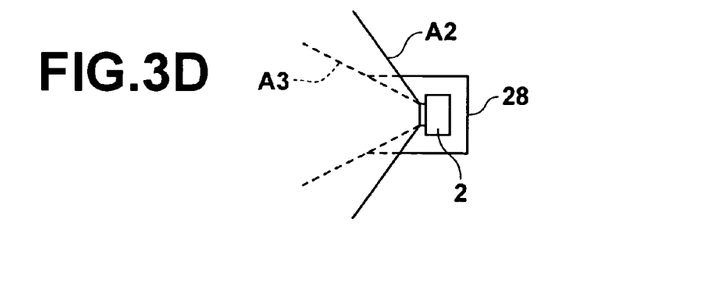
FIG. 3D is a schematic view showing another alternate configuration of the camera.

As illustrated in FIG. 3D, by forming the case 28 to be longer at the wireless communication unit 21 than a part of the case 28 corresponding to the imaging unit 22 (refer to the broken lines), it is also possible to make a data communication range A3 of the wireless communication unit 21 less than a range A2 of the angle of view of the imaging unit 22.

The thumbnail generating unit 23 reduces the photographic image represented by the image data S0 by thinning pixels of the image data S0 and generates the thumbnail image data SM. It is also possible to generate the image data of which the amount of data is less than that of the image data S0 instead of the thumbnail image data SM, by compressing the image data S0 at a higher compression ratio, using an interpolation operation, deteriorating image quality, etc.

The controller 26 controls drive of the wireless communication unit 21 so that the wireless communication unit 21 constantly searches for the terminal device 1. When the subject user moves to the data communication range of the wireless communication unit 21 and the wireless communication unit 21 and the wireless communication unit 11 in the terminal device 1 become able to communicate data each other, the imaging unit 22 is driven and the imaging unit 22 photographs the subject user. The image data S0 obtained in this manner are temporarily stored in the memory 25 and the thumbnail image data SM are generated by the thumbnail generating unit 23 at the same time. The generated thumbnail image data SM are transmitted from the wireless communication unit 21 to the terminal device 1. After transmission of the thumbnail image data SM, the controller 26 further controls drive of the LAN interface 24 so that the image data S0 are transmitted from the LAN interface 24 to the image server 4 according to an instruction regarding the image data S0, transmitted from the terminal device 1.

The subject user does not always keep moving in the facility, and in some case, the subject user stays in the data communication range of the wireless communication unit 21. In such a case, the photographic images of the subject user will be shot continuously from the same angle. Therefore, the controller 26 stops drive of the imaging unit 22 to prohibit photography of the subject user after three images have been photographed continuously, for example. It is also possible to stop the drive of the imaging unit 22 to prohibit photography of the subject user who has been photographed for fixed time (30 seconds to 1 minute, for example) after one photograph has been shot. In the description of the first embodiment, it is assumed that the drive of the imaging unit 22 is stopped as in the former case.

Figure 4:
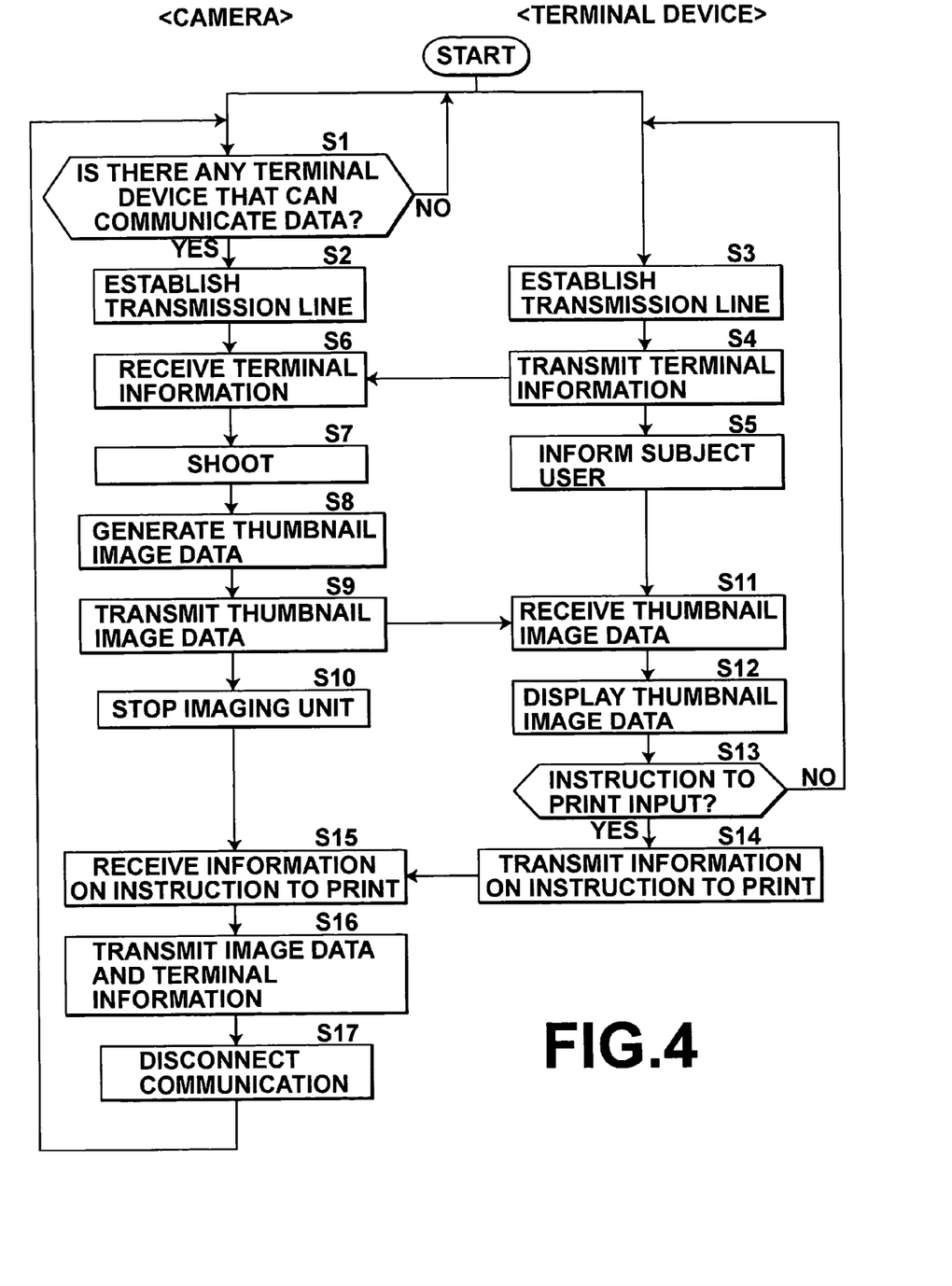
FIG. 4 is a flow chart showing processing in the first embodiment.

Next, processing in the first embodiment will be described. FIG. 4 is a flow chart showing processing in the first embodiment. The controller 26 in the camera 2 drives the wireless communication unit 21, and monitors if there is any terminal device 1 that can communicate data with the wireless communication unit 21 (step S1). When step S1 is YES, a transmission line to the terminal device 1 which has become able to communicate data is established (step S2).

Meanwhile, the controller 16 in the terminal device 1 establishes a transmission line to the wireless communication unit 21 in the camera 2, which has become able to communicate data with the wireless communication unit 11 (step S3). Next, the controller 16 transmits the terminal information stored in the memory 14 to the camera 2 (step S4), and the informing unit 15 informs the subject user that the terminal device 1 has become able to communicate data with the camera 2 at the same time (step S5).

When the controller 26 in the camera 2 receives the terminal information (step S6), the controller 26 drives the imaging unit 22 immediately, the imaging unit 22 photographs the subject user carrying the terminal device 1, and the image data S0 representing the image of the subject user are obtained (step S7). In this case, three images are shot continuously, and three image data S01-S03 are obtained. Then, the controller 26 drives the thumbnail generating unit 23 and the thumbnail generating unit 23 generates the thumbnail image data SM1-SM3 from the image data S01-S03 (step S8), and transmits the thumbnail image data SM1-SM3 from the wireless communication unit 21 to the terminal device 1 (step S9). After this, the controller 26 stops the drive of the imaging unit 22 (step S10).

The controller 16 in the terminal device 1 receives the thumbnail image data SM1-SM3 using the wireless communication unit 11 (step S11), and displays thumbnail images represented by the thumbnail image data SM1-SM3 on the liquid crystal monitor 12 (step S12). The three thumbnail images are displayed by switching among them on the liquid crystal monitor 12 by an operation of the operation unit 13. Then, the controller 16 judges if the instruction to print has been input from the operation unit 13 or not (step S13). If the judgment in step S13 is YES, the information regarding the instruction to print is transmitted from the wireless communication unit 11 to the camera 2 (step S14). When step S13 is NO, processing returns to step S13.

When the wireless communication unit 21 receives the information regarding the instruction to print (step S15), the controller 26 in the camera 2 assigns the information regarding the instruction to print to the image data S01-S03, and transmits the image data S01-S03 and the terminal information from the LAN interface 24 to the image server 4. (step S16). When the information regarding the instruction to print has not been received for determined time after transmission of the thumbnail image data SM1-SM3, it is judged that the image data S01-S03 should not be printed, and the image data S01-S03 are transmitted directly to the image server 4 together with the terminal information. Then, communication with the presently connected terminal device 1 is disconnected (step S17). The processing then returns to step S1.

Figure 5:
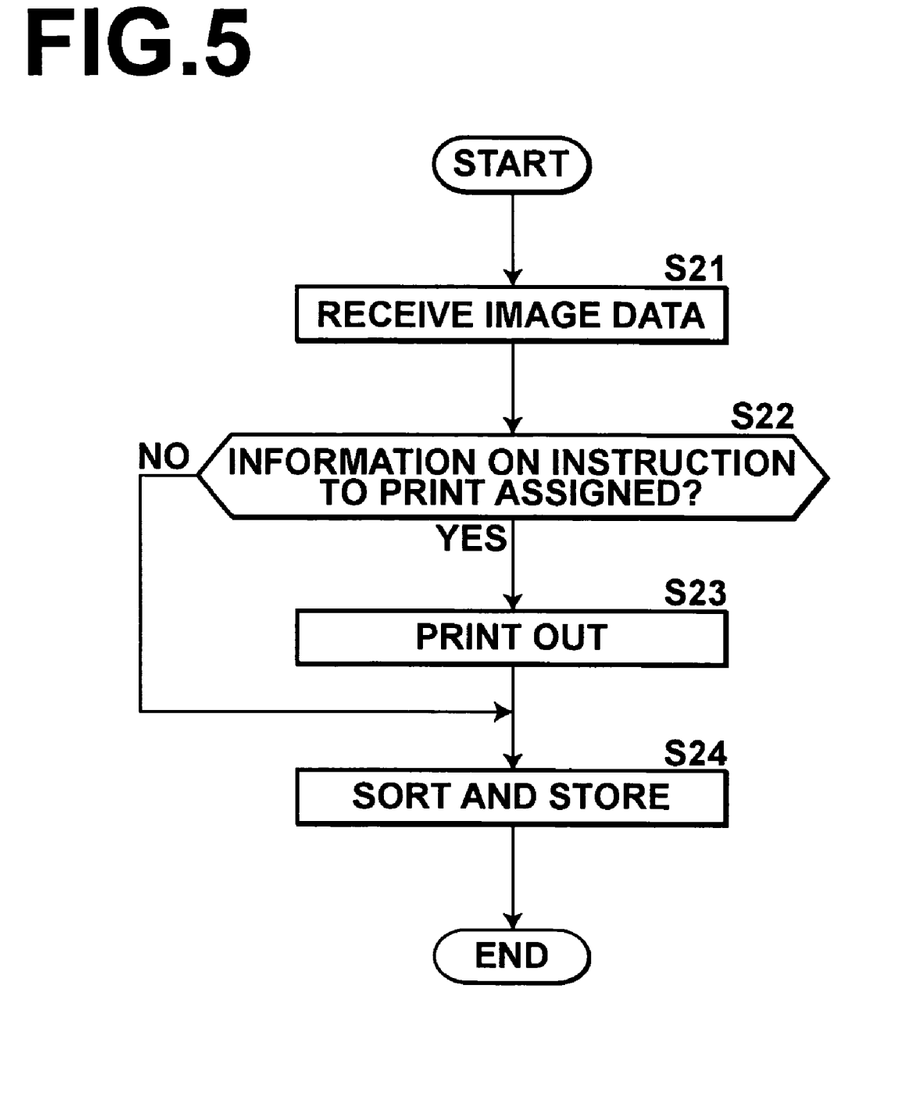
FIG. 5 is a flow chart showing processing in an image server and a printer.

FIG. 5 is a flow chart showing processing performed in the image server 4 and the printer 5. First, the image server 4 receives the image data S01-S03 transmitted by the camera 2 (step S21), and judges if the information on the instruction to print is assigned to the image data S01-S03 received or not (step S22). If the judgment in step S22 is YES, the image data S01-S03 are transmitted to the printer 5, and the printer 5 prints out the image data S01-S03 (step S23). Prints are sorted according to the terminal information transmitted together with the image data S01-S03 so that the prints can be handed to the subject user easily.

When step S22 is NO and after step S23, the image server 4 sorts the image data S0 according to the terminal information transmitted together with the image data S0, stores the image data S0 (step S24), and the processing ends.

The subject user can browse the image data S0 stored in the image server 4 later by accessing the image server 4 from a personal computer or the like. At this time, since the image data S0 are sorted according to the terminal information, the subject user can easily retrieve the image data S0 representing the photographic image of him or herself.

As described above, in the first embodiment, the camera 2 photographs the subject user carrying the terminal device 1. Therefore, anyone carrying the terminal device 1 can become the subject of the camera 2. Further, since the thumbnail image data SM of the image data S0 photographed by the camera 2 are transmitted to the terminal device 1 immediately after photography, the subject user can look at the photographed image immediately. Therefore, the subject user does not need to try to find the photographic image of him or herself at the exit of the attraction, and the subject user does not fail to obtain the photographs. Further, the space for displaying the photographs of the subject user becomes unnecessary.

Further, since the instruction to print is issued at the terminal device 1, the subject user can look at the thumbnail images displayed on the liquid crystal monitor 12 and decide immediately if the thumbnail images should be printed or not. Accordingly, it is possible to record an exact feeling when the image is photographed in a print.

Since the terminal information that specifies the terminal device 1 carried by the subject user is assigned to the image data S0 and transmitted to the camera 2, when the image data S0 are stored in the image server 4 or printed out by the printer 5, the image data S0 can be sorted according to the terminal information and stored, and prints can be sorted according to the terminal information. Accordingly, it becomes easy to find the image data S0 or the prints later.

Since the wireless communication unit 21 and the imaging unit 22 are arranged so that the data communication range of the wireless communication unit 21 in the camera 2 and a direction of the angle of view of the imaging unit 22 are user in the image obtained by the imaging unit 22.

Particularly, as illustrated in FIG. 3D, by forming the case 28 longer at the wireless communication unit 21 than the part of the case 28 corresponding to the imaging unit 22 (refer to the broken lines), the data communication range A3 of the wireless communication unit 21 becomes less than the range A2 of the angle of view of the imaging unit 22. Therefore, the subject user can be surely included in the image obtained by the imaging unit 22.

By stopping the imaging unit 22 after a predetermined number (three in this embodiment) of images have been photographed, photography of the subject user by the imaging unit 22 is prohibited. Therefore, it is possible to prevent continuous photography of the subject user carrying the terminal device 1 which can communicate with the wireless communication unit 21.

Further, by providing the informing unit 15 for informing that the wireless communication unit 11 in the terminal device 1 has become able to communicate data with the wireless communication unit 21 in the camera 2 in the terminal device 1, the subject user can know that the terminal device 1 and the camera 2 have become able to communicate data, and the subject user will be photographed soon.

Next, a second embodiment of the present invention will be described. In the above first embodiment, when the camera 2 becomes able to communicate data with the terminal device 2 becomes able to communicate data with the terminal device 1, the camera 2 photographs the subject user immediately. However, in the second embodiment, the subject user causes the camera 2 to perform photography of him or herself by issuing an instruction to perform photography from the terminal device 1.

Figure 6:
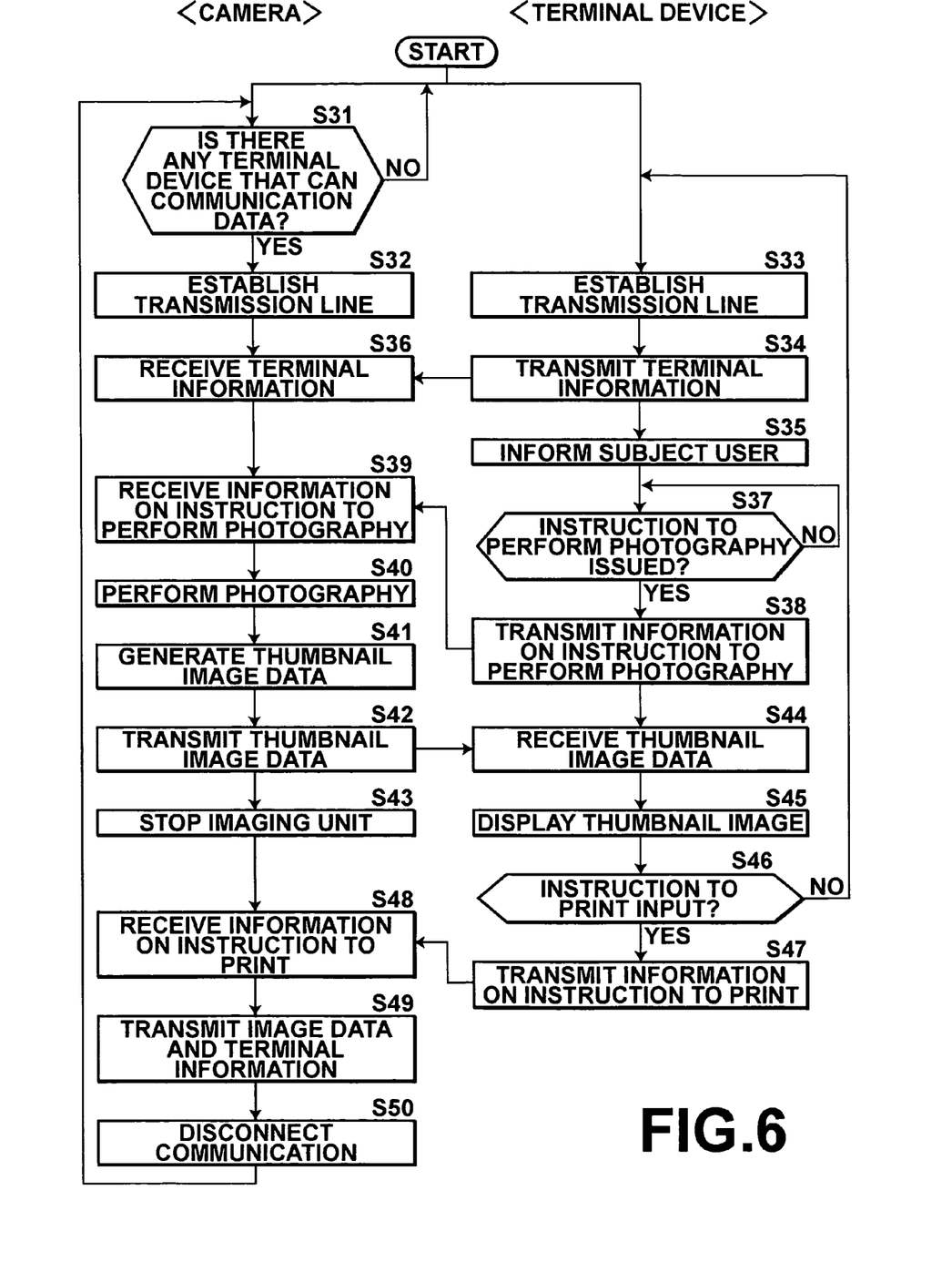
FIG. 6 is a flow chart showing processing in a second embodiment.

FIG. 6 is a flow chart showing processing in the second embodiment. The controller 26 in the camera 2 drives the wireless communication unit 21, and monitors if there is any terminal device 1 that can communicate data with the wireless communication unit 21 (step S31). When the judgment in step S31 is YES, a transmission line to the terminal device 1 which has become able to communicate data is established (step S32).

Meanwhile, the controller 16 in the terminal device 1 establishes a transmission line to the wireless communication unit 21 in the camera 2, which has become able to communicate data with the wireless communication unit 11 (step S33). Next, the controller 16 transmits the terminal information stored in the memory 14 to the camera 2 (step S34), and the informing unit 15 informs the subject user that the terminal device 1 has become able to communicate data with the camera 2 (step S35). The controller 26 in the camera 2 receives the terminal information (step S36).

Next, the controller 16 in the terminal device 1 begins to monitor if the subject user has given the instruction to perform photography by operating the operation unit 13 (step S37). When the judgment in step S37 is YES, the information regarding the instruction to perform photography is transmitted from the wireless communication unit 11 to the camera 2 to cause the camera 2 to perform photography (step S38).

When the controller 26 in the camera 2 receives the information regarding the instruction to perform photography (step S39), the controller 26 drives the imaging unit 22, the imaging unit 22 photographs the subject user carrying the terminal device 1, and the image data S0 representing the image of the subject user are obtained (step S40). Then, processing in steps S41-S50, which are similar to steps S8-S17 in the first embodiment are performed.

As described above, in the second embodiment, since the image is photographed only when the instruction to perform photography is issued from the terminal device 1, it is possible to make the camera 2 perform photography only when the subject user wants to be photographed and display the thumbnail image of the image data S0 in the terminal device 1. Therefore, it is possible to prevent the subject user from being phtographed in an undesirable posture, e.g., looking aside, squatting, etc.

In the above first and second embodiments, the subject user is photographed by a single camera. However, since two cameras (cameras 2A and 2B) in an area surrounded by a broken line illustrated in FIG. 1 have a common photography range A1 illustrated by hatching in FIG. 1, the two cameras can collaborate. In the following description, processing for photographing the subject user by collaboration of the two cameras 2A and 2B will be described as a third embodiment.

Figure 7:
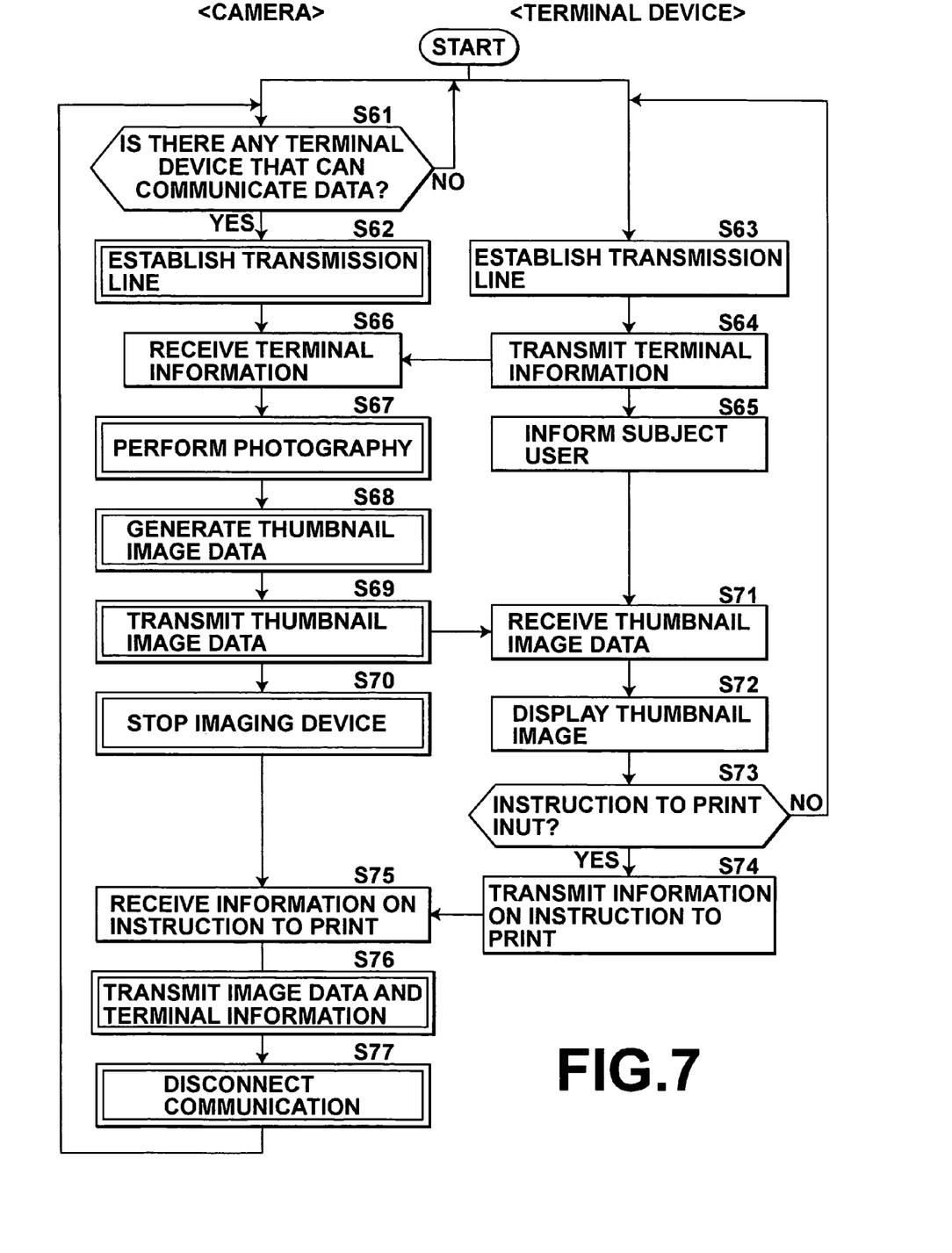
FIG. 7 is a flow chart showing processing in a third embodiment.

FIG. 7 is a flow chart showing processing in the third embodiment. In FIG. 7, processing performed by both of the cameras 2A and 2B is surrounded by a double line, and processing performed only by the camera 2A is surrounded by a single line. The controller 26 in the camera 2A monitors if the subject user has moved to the photography range A1 and has become able to communicate with both of the cameras 2A and 2B or not (step S61). When the judgment in step S61 is YES, the camera 2A informs the camera 2B that the subject user has moved to the photography range A1 and has become able to communicate with both of the cameras 2A and 2B, and the controller 26 in each of the cameras 2A and 2B establishes a transmission line between the wireless communication unit 21 and the terminal device 1 (step S62).

Meanwhile, the controller 16 in the terminal device 1 establishes a transmission line to the wireless communication units 21 in the cameras 2A and 2B, which have become able to communicate data with the wireless communication unit 11 (step S63). Next, the controller 16 transmits the terminal information stored in the memory 14 only to the camera 2A (step S64), and the informing unit 15 informs the subject user that the terminal device 1 has become able to communicate data with the cameras 2A and 2B (step S65).

When the controller 26 in the camera 2A receives the terminal information (step S66), the wireless communication unit 21 transmits the instruction to perform photography to the camera 2B, the controllers 26 in the cameras 2A and 2B drive the imaging units 22, the imaging units 22 photograph the subject user carrying the terminal device 1, and the image data S0 representing the image of the subject user are obtained respectively (step S67). In the third embodiment, each of the cameras 2A and 2B photographs three images continuously and obtain the three image data S01-S03. Then, the controller 26 in each of the cameras 2A and 2B drives the thumbnail generating unit 23, and the thumbnail generating unit 23 generates the thumbnail image data SM1-SM3 from the image data S01-S03 (step S68). The wireless communication units 21 transmit the thumbnail image data SM1-SM3 to the terminal device 1 (step S69). After this, the controller 26 in each of the cameras 2A and 2B stops the drive of the imaging unit 22 (step S70).

The controller 16 in the terminal device 1 receives the thumbnail image data SM1-SM3 transmitted from each of the cameras 2A and 2B using the wireless communication unit 11 (step S71). The thumbnail images represented by the thumbnail image data SM1-SM3 are displayed on the liquid crystal monitor 12 (step S72). A thumbnail image is displayed by switching from among six thumbnail images on the liquid crystal monitor 12 by an operation of the operation unit 13. Then, the controller 16 judges if the instruction to print has been input from the operation unit 13 or not (step S73). When the judgment in step S73 is YES, the information on the instruction to print is transmitted from the wireless communication unit 11 only to the camera 2A (step S74). When step S73 is NO, processing returns to step 73.

When the wireless communication unit 21 receives the information regarding the instruction to print (step S75), the controller 26 in the camera 2A transmits the information regarding the instruction to print from the wireless communication unit 21 to the camera 2B, the cameras 2A and 2B assign the information regarding the instruction to print to the image data S01-S03, and transmit the image data S01-S03 and the terminal information from the LAN interface 24 to the image server 4 (step S76). When the information regarding the instruction to print is not received for a predetermined time after transmission of the thumbnail image data SM1-SM3, it is judged that the image data S01-S03 should not be printed, and the camera 2A transmits the image data S01-S03 directly to the image server 4 together with the terminal information. Then, communication with the presently connected terminal device 1 is disconnected (step S77). The processing then returns to step S61.

As described above, in the third embodiment, when both of the two cameras 2A and 2B that have the overlapping photography range A1 have become able to communicate data with the terminal device 1, i.e., when the subject user has moved to the photography range A1, the cameras 2A and 2B perform photography respectively. Therefore, the subject user can be surely photographed.

In a case of photography using the single camera 2, when the terminal device 1 becomes able to communicate data at a position far from the wireless communication unit 21, a size of the subject user included in the photographed image becomes small. Therefore, by arranging the cameras 2A and 2B to have an overlapping photography range A1 so that the subject user in an appropriate size is included in the photographed image, the subject user can be included in the image represented by the image data S0 at an appropriate size. Further, since the photography range A1 can be set in advance, it is possible to know distances from the cameras 2A and 2B to the subject user approximately.

Further, since the camera 2A gives the instruction to perform photography to the camera 2B, the two cameras 2A and 2B can perform photography simultaneously.

In the above third embodiment, only the camera 2A receives the terminal information and the information on the instruction to print. However, both of the cameras 2A and 2B can also receive the terminal information and the information regarding the instruction to print. A load on the terminal device 1 at time of communication can be reduced by transmitting the terminal information and the information regarding the instruction to print only to the single camera 2A.

In the above third embodiment, the cameras 2A and 2B perform photography after receiving the terminal information. However, the cameras 2A and 2B can photograph the subject user also by the instruction from the terminal device 1 as in the second embodiment. In this case, by transmitting the instruction to perform photography to the single camera 2A and transmitting the instruction to perform photography from the camera 2A to the camera 2B, the two cameras 2A and 2B can perform photography simultaneously. Meanwhile, in a case that the instruction to perform photography is transmitted to each of the cameras 2A and 2B respectively, each of the cameras 2A and 2B photographs when the instruction to perform photography is received at each of the cameras 2A and 2B.

In the above third embodiment, collaboration between the two cameras 2A and 2B was explained. However, collaboration among three or more cameras is possible in a manner similar to the collaboration between the two cameras.

Figure 8:
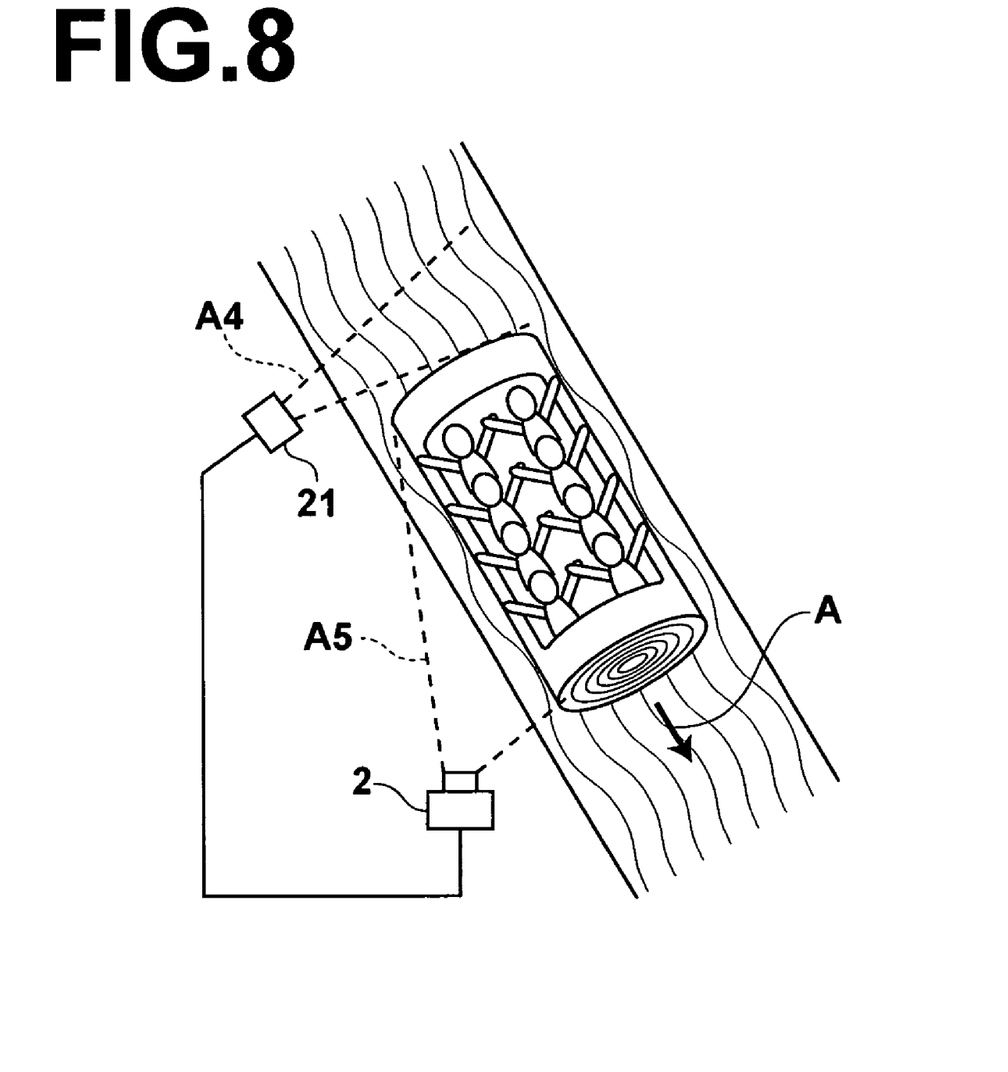
FIG. 8 is a drawing for explaining a state of photography by shifting a data communication range of a wireless communication unit and an angle of view of the camera.

In the above first through third embodiments, an angle of view of the camera 2 and the data communication range of the wireless communication unit 21 are identical. However, in some attractions in the facility, the subject user moves by riding on a ride. Therefore, as illustrated in FIG. 8, it is possible to shift a data communication range A4 of the wireless communication unit 21 and an angle A5 of view of the camera 2 in consideration of a moving speed of the ride moving in a direction of arrow A so that the camera 2 can shoot the subject user who is moving even when the camera 2 photographs the subject user after the terminal device 1 and the camera 2 have become able to communicate data with each other.

In the above first through third embodiments, when the terminal device 1 becomes able to communicate data with the cameras 2, 2A, and 2B, the informing unit 15 informs the subject user that the terminal device 1 has become able to communicate data with the cameras 2, 2A, and 2B. However, the cameras 2, 2A, and 2B can also transmit information that the terminal device 1 has become able to communicate data with the cameras 2, 2A, and 2B to the terminal device 1 at time of photography, and the informing unit 15 can inform the subject user that photography will start based on this information. Additionally, after photography, the cameras 2, 2A, and 2B can also transmit information that photography has been finished, and the informing unit 15 can inform the subject user that photography has been finished based on the information.

In the above first through third embodiments, a base station which is not illustrated can transmit map data representing a map showing positions of the cameras installed in the facility to the terminal device 1 when the visitor enters the facility. Accordingly, the subject user becomes able to know where the cameras 2 are installed in the facility easily by displaying the map data on the liquid crystal monitor 12.

Further, in the above first through third embodiments, the thumbnail image data SM of the image data S0 are generated and transmitted to the terminal device 1. However, the image data S0 can be transmitted to the terminal device 1 directly. In this case, by making it possible to load a memory card in the terminal device 1, the image data S0 can be stored in the memory card.

It is also possible to transmit the thumbnail image data SM and the image data S0 to the image server for storing the image data S0 without transmitting the thumbnail image data SM and the image data S0 to the terminal device 1. In this case, the subject user can browse the thumbnail image data SM and the image data S0 later by accessing the image server from a terminal device, e.g., personal computer, cellular phone, etc. of the subject user.

What is claimed is:

1. An imaging system for interaction with one or more subject carried terminal devices, the one or more terminal devices including a display capable of displaying images and a communication device to enable communication therewith, the imaging system comprising:
    at least one imaging means for photographing a subject carrying a terminal device and for obtaining image data representing an image of the subject;
    an imaging communication means included with each associated imaging means for providing wireless data communication to the subject carried terminal devices from the imaging communication means and for receiving wireless data communication from the subject carried terminal devices; and
    a control means for controlling the operation of the imaging means so that the imaging means is driven to obtain image data when the terminal device carried by the subject and the imaging communication means become able to communicate with each other to determine the subject is within the image data to be obtained by the imaging means; and
    communication range restricting means for limiting wireless data transmission from the imaging communication means and wireless data reception by the imaging communication means to be in an angular range along a direction in common with an imaging direction of the associated imaging means,
    wherein the communication range restricting means further restricts the angular range to have an angular extent that matches an imaging angle of view of the associated imaging means, and
    the control means controls the imaging communication means to transmit image data representing the image of the subject obtained by the imaging means to the terminal device of the subject carrying the terminal device that is in the angular range of the communication range restricting means for display thereon.

2. The imaging system as defined in claim 1, wherein the control means is a means for assigning terminal information that specifies the terminal device carried by the subject to the image data.

3. The imaging system as defined in claim 1, wherein the control means is a means for generating small capacity image data of which data volume is less than the image data and transmitting the small capacity image data to the terminal device instead of the image data.

4. The imaging system as defined in claim 1, wherein the control means is a means for controlling the drive of the imaging means so that photography is prohibited after a predetermined number of images have been photographed continuously.

5. The imaging system as defined in claim 1, wherein the control means is a means for controlling the drive of the imaging means so that imaging is prohibited for a predetermined time after photography.

6. The imaging system as defined in claim 1, wherein the control means is a means for controlling the drive of the imaging means so that the imaging means performs photography only when the terminal device gives an instruction to perform photography.

7. The imaging system as defined in claim 1, wherein a plurality of the imaging means are provided with overlapping imaging ranges and the control means in each of the imaging means controls the drive of an associated one of the plurality of imaging means so that when all the imaging communication means included with each of the plurality of imaging means have become able to communicate data with the terminal device, the plurality of imaging means photograph respective images.

8. The imaging system as defined in claim 1 further comprising:
    an image server for storing the images obtained by the at least one imaging means.

9. The imaging system as defined in claim 1, further comprising:
    a printer for printing out the image data obtained by the at least one imaging means.

10. The imaging system as defined in claim 9, wherein the printer only prints out the image data for which an instruction to print has been issued.

11. The imaging system as defined in claim 10, wherein the instruction to print can be issued at the one or more terminal devices.

* * * * *